Sept. 4, 1956

U. PIUMI 2,761,978

ELECTRICAL STARTING AND BATTERY-CHARGING
SYSTEM FOR MOTOR VEHICLES

Filed Jan. 5, 1955

U. PIUMI 2,761,978

ELECTRICAL STARTING AND BATTERY-CHARGING
SYSTEM FOR MOTOR VEHICLES

Filed Jan. 5, 1955

United States Patent Office 2,761,978
Patented Sept. 4, 1956

2,761,978

ELECTRICAL STARTING AND BATTERY-CHARGING SYSTEM FOR MOTOR VEHICLES

Ugo Piumi, Bologna, Italy

Application January 5, 1955, Serial No. 480,530

6 Claims. (Cl. 290—22)

This invention relates to an electrical starting and battery charging system for motor vehicles, of the kind in which as starter of the combustion engine of the vehicle an electrodynamic direct current machine is employed which may be coupled to the internal combustion engine and which during the starting acts as an electric motor to which the current is fed by a battery and which, after the internal combustion engine has been started, acts as an electric generator which is driven by said combustion engine and charges the battery and/or generates the current for feeding other electrical devices.

The invention has for its object to provide a particularly simple electric starting system for internal combustion engines in which the electridynamic machine acts either as starting motor or as a dynamo, and which will be referred to as "starting generator" when it is employed for starting the combustion engine and acts as a compound motor and is fed with a voltage which is higher than the voltage which it generates, and when it is operated as a shunt generator, serves for charging the battery and/or for feeding current to other devices. Thus, when it acts as starting motor for a very short time, for its excitation, both its field coils are inserted in circuit, and when it is fed with a current at a greater voltage, it develops a greater torque which renders possible a very quick starting of the internal combustion engine, even under unfavorable conditions.

The invention aims further to provide an improved electrical system by which the starting of the starting generator and its switching from its working as motor to its working as generator is effected by means of a simple, preferably distant-controlled switch which connects together the armature or rotor and the field coils of the compound wound starting generator and the battery, which is divided into two halves in such a manner that the starting generator, when it is switched so as to function as starting motor shows the characteristic of a compound motor and is fed by both battery halves in series, whereas, when it is switched so as to work as a generator, it feeds the charging current to the two battery halves in parallel.

A further object of the invention is to simplify the electrical system by providing a control device for regulating the voltage at the terminals of the starting generator (when this latter functions as a generator) and for the control of the current which serves for charging the accumulators so that, for the starting of the motor generator acting as a motor and for its switching from motor to generator it is sufficient to act on a single switch, without switching or bridging over the same controlling devices.

Still another object of the invention is to provide an improved electrical system particularly adapted for use on two-cycle engines mounted on vehicles and adapted also to reverse running, and in which, by means of a special switch it is possible to reverse the direction of the current within the rotor, or also within the main field coil of the starting generator, thus rendering it possible to employ the starting generator for the starting of the two-cycle engine in either direction and to eliminate the reverse from the change speed gear.

The invention resides in a novel electrical system permitting of accomplishing the above and other results, as will be better understood from the following specification in which three embodiments are described and shown by way of example in the attached drawings, in which.

Figure 1:
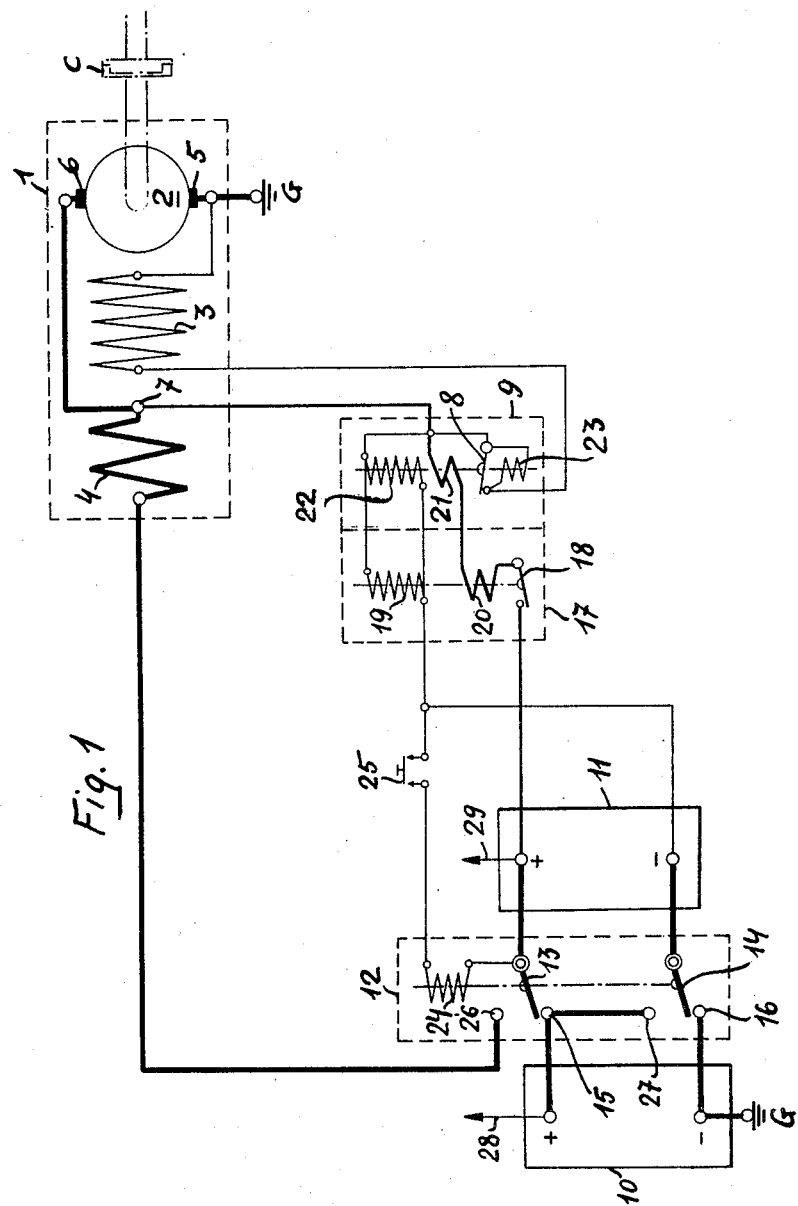
Figure 1 shows an electrical system adapted to be used for the starting of an internal combustion engine of a motor vehicle as well as for the charging of its accumulators. In this diagram the switches are shown in accumulator-charging position.

In the embodiment of the electrical system for use on a motor vehicle driven by an internal combustion engine, as shown in Figure 1, 1 indicates diagrammatically the starting generator, which may be coupled to the combustion engine (not shown) through a coupling C (shown diagrammatically).

The starting generator 1 comprises a rotor 2, a shunt field coil 3 and a series field coil 4. The starting generator is generally of a multi-pole type and is provided with a plurality of brushes, although in the drawing, for clarity, the coils have been shown sidewise of the generator and only two brushes have been shown. The brushes are connected to the terminals 5 and 6. Terminal 5 is connected directly to the body G of the vehicle, while terminal 6 is connected with terminal 7 of the series field coil 4. The shunt field coil 3 is connected on one side with terminal 5 and to the vehicle body G and, on the other side, is connected, through the switch contact 8 and a conventional voltage regulator 9, to terminal 7. When the contact 8 of the voltage regulator is closed, the shunt field coil 3 is placed in parallel with rotor 2 of the starting generator 1.

During the normal running of the combustion engine, the starting generator 1 is driven by this latter and it functions as a generator with shunt excitation, and thus it charges both batteries 10 and 11, which possess an equal number of cells and are connected to the distant-control bipolar switch 12. In rest position, the movable contact 13 of switch 12 connects the two positive poles of the batteries together. In fact, the switching contact 13, which is connected to the positive pole of battery 11, contacts with the fixed contact 15, which, in turn is connected to the positive pole of battery 10, while the switching contact connected to the negative pole of battery 11 is in leading contact with the fixed contact 16, which is connected with the negative pole of battery 10. The negative pole of battery 10 is connected to the vehicle body G, and thus it is constantly connected with terminal 5 of rotor 2.

The positive pole of the battery 11, and with it also the switching contact 13, the fixed contact 15 and the positive pole of battery 10, may be connected to the terminal 7 of the starting generator 1 through the minimum tension relay 17, namely through the contact 18 thereof. The contact 18 of the minimum current relay 17 closes only when its shunt or voltage coil 19 and/or its series or current coil 20 are sufficiently energized. The shunt coil 19 is connected on one side with the terminal 7 on the other side with the negative pole of battery 11. The coil 20 is in series with the switching on contact 18 of the minimum current relay 17 in the circuit of the charging current, between the terminal 7 of the starting generator 1 and the positive pole of battery 11.

In this charging line, the current coil 21 of the voltage regulator 9 is inserted, which is also provided with a voltage coil 22 which is connected, in parallel respect to the voltage coil 19 of the minimum current relay 17, to the terminal 7 of the starting generator 1 and to the negative pole of battery 11. In parallel with the contact 8 of the switch of the voltage regulator 9, still another voltage coil 23 is arranged, which is energized only when the contact of the switch 8, due to the action of the current flowing through the coils 21 and 22, is opened. This coil 23 serves for closing again the contact 8 by acting as interrupting contact, whereby the median value of the energizing current in the shunt coil 3 acts in such a manner that, both voltage and current at the terminals of the starting generator remain within predetermined limits.

The bipolar switch 12, which is distant controlled, is provided with a control coil 24, which, through push button 25 may be connected to both poles of battery 11. This coil, when it is energized, switches the contacts 13 and 14 of switch 12 from their rest position shown in Figure 1 and at which position it is maintained, for example, by a spring (not shown), into their working position, so that the contact 13 connects the positive pole of the battery 11 with the fixed contact 26 and, therefore, with the free end of the series coil 4 of the starting generator 1, while the switching contact 14 connects the negative pole of battery 11 with the fixed contact 29 of switch 12 and through the leading line connecting same to point 15, connects the negative pole of the battery 11 with the positive pole of battery 10. In this working position of switch 12, both batteries 10 and 11 are connected in series between them and with the series coil 4 of the starting generator 1, which then starts as a motor with compound excitation and, through coupling C, starts the combustion engine (not shown).

The other electric devices, of the installation (not shown) are connected with the positive pole of battery 10. Arrow 28, indicates the electrical devices connected with this point. The ignition of the combustion engine of the vehicle may be connected, as usual, with the positive pole of battery 10, together with other electrical devices. In this case, however, the ignition voltage, at the moment of the starting of the combustion engine, is small due to the significant voltage fall in the two batteries, so that the sparks generated by the spark plugs are much smaller than in the normal working of the engine. For this reason, it is desirable that the ignition be connected exclusively, namely without other electrical devices, to the positive pole of battery 11, as shown by the arrow 29. In this manner, due to series connection of the two batteries, the ignition voltage is almost double and thus it is able to generate very strong sparks, which render the starting of the combustion engine easy. When the coil 24 which controls the switch 12 is not energized, the starting generator 1 may function as a shunt generator, driven by the combustion engine and charge both batteries 10 and 11 which are connected in parallel, and feed the other electrical devices of the vehicle.

When the starting generator has reached a sufficiently high number of revolutions, it is self-energized through the shunt coil 3 in parallel with the rotor 2, as the break contact 8 of the tension regulator 9 becomes closed beforehand. The contact 18 of the minimum current relay 17 taken is open. When the voltage of the starting generator, while working as a generator, has reached a value which is considerably in excess of the rest tension of batteries 10 and 11, which are connected in parallel between them, the voltage coil 19 of the minimum-current relay 17 effects the closure of the contact 18 of this relay. When this contact 18 is closed, the current flows through the series coil 20 of the minimum-current relay 17 and keeps contact 18 closed, even if a voltage drop takes place at the terminals of the starting generator. In this event, the current flows from terminal 6 of rotor 12 through the connecting contact 7 of the series coil 21 of the voltage regulator 9, the series coil 20 of the minimum current relay 17 and to the positive pole of battery 11. At this point the current is branched and one of the branches, through the movable contact 13 of switch 12, and the contact 15 of the same switch, flows to the positive pole of battery 10, and through the battery, flows to the negative pole and to the grounded contact G, while the other branch current flows through battery 11 to the negative pole of this battery and then, through the switching contact 14, flows to contact 16 of switch 12 and from this, through the negative pole of battery 10, passes also to contact G. Contact G, which is connected to the negative pole of battery 10, is connected through the vehicle body to the contact G which is connected to the terminal 5 of the rotor 2.

A part of the current generated by the generator is branched from the positive pole of battery 10 towards the line 28 which leads to the other electric devices of the vehicle, which in turn are connected in a known manner with the vehicle body (contact G), so that also this current may flow back to the terminal 5 of rotor 2. During the working of the starting generator 1 as a shunt-wound dynamo, the voltage at its terminals is regulated in a known manner by the voltage regulator 9, in which the series coil 21 and the shunt coil 22 co-act in such a manner as to avoid both an undesired voltage rise and an undesired current increase.

If the speed of the starting generator is reduced excessively, the voltage at the terminals 5 and 6 of rotor 2 is equally reduced. At the same time, also, the current generated by the starting generator 1 is reduced. When the value of the voltage and of the current, as determined by the dimensioning of the shunt coil 19 and of the series coil 20 of the minimum current relay 17, reaches a predetermined limit, the contact 18, which is controlled by these coils, is opened and thus interrupts a further feed of the starting generator current to the battery and to the electrical device of the vehicle. If the R. P. M. of the starting generator 1 are again increased, the voltage at its terminals again rises until the contact 8 of the switch of the voltage regulator 9 is inserted. When the voltage at the terminals of the generator is sufficiently high, the shunt coil 19 of the minimum current relay 17 causes contact 18 of this relay to be again inserted, and thus the accumulator-charging circuit is again closed.

When the batteries are completely charged, the charging current is reduced, as the voltage of the starting generator 1 is limited to a value which corresponds to the charging voltage of the batteries, by the action of the switch 9 of the voltage regulator, whose interrupting contact 8 functions as a "vibrating regulator." The reduction of the charging current to a very small value causes series coil 20 of the minimum-current relay 17 to be very slightly energized, so that the contact 18 falls down, and thus the charging is completely interrupted. Only when the other electrical devices (spark plugs, lighting, and so on) have again reduced the battery voltage, is the minimum current relay 17 again inserted.

If the starting generator is to work as a starting device, the push button 25 is depressed, and thus the coil 24 of switch 12 is energized and promotes a switching of the two movable contacts 13 and 14 of the switch. These switching contacts 13 and 14 close now the following starting current circuit: from the vehicle body (contact G) through the battery 10, the contacts 15, 27 and 14 of switch 12 to the negative pole of battery 11, the positive pole of battery 11, switching contact 13 of switch 12, series wound field coil 4, terminal 7 and the coils, in parallel between them, of the rotor 2 and of the shunt wound field coil 3. The contact 18 of the minimum current relay 17 is opened, as neither its shunt coil 19, nor its series coil 20 is energized in such a measure as to close the contact. The two batteries 10 and 11 are now connected in series, and the starting generator 1 is driven as a compound motor, as both the series coil 4 and the shunt coil 3 are inserted. As in the series field coil 4, which has few windings, the voltage drop is a minimum, at the starting, almost the whole voltage of the two batteries in series is applied to the shunt winding 3, so that through this winding passes a very strong current.

The shunt field winding 3 co-acts, therefore, with the series winding 4 for the generation of the magnetic field for the driving of the motor, and, therefore, it generates a very high torque. The high torque that the starting motor generates at its starting from its stop position, promotes a very rapid acceleration of the combustion engine to be started, which therefore very rapidly reaches its normal speed. At the starting of the combustion engine, in order that the shunt coil 19 of the minimum current relay 17 may not be able to insert the contact 18 of this relay, and in order that the shunt coil 22 of the voltage regulator 9 may not open the interrupting contact 8, these coils are inserted between the terminal 7 of the starting generator 1 and the negative pole of battery 11, so that they are connected only to a voltage that is less than one-half of the voltage fed to the starting generator by the batteries in series 10 and 11.

At depressing the starting push button 25, the driver instantly notes when the motor is started and then he ceases to depress said push button 25, and thus the coil 24 which controls the switch 12 is de-energized and under the action of the pulling springs (not shown) its switching contacts 13 and 14 return to their rest position. At the same time, the curernt which flows through the series coil 4 is interrupted and the two batteries 10 and 11 are connected in parallel. When the voltage of the starting generator is increased, the voltage or shunt coil 19 of the minimum-current relay 17 promotes the insertion of the switching contact 18 of this relay, and thus it closes the circuit between the starting generator 1 and the batteries 10 and 11 that are in parallel. The charging process need not be described as this has been already done while describing the working of the starting generator 1.

In small vehicles, in which both motors and gears must be very simple and light, it is desirable to have a change speed gear without a reverse drive. It is known that in two-cycle engines, by a suitable regulation of the ignition, it is possible to cause said engines to revolve in either direction and, in order to do this, it is sufficient to start same in the desired direction of rotation. Now, in motor vehicles provided with two cycle engines, it is possible to eliminate the reverse drive from the change speed gear, if it is possible to cause the electric starting motor of these engines to be started in either direction.

Figure 2:
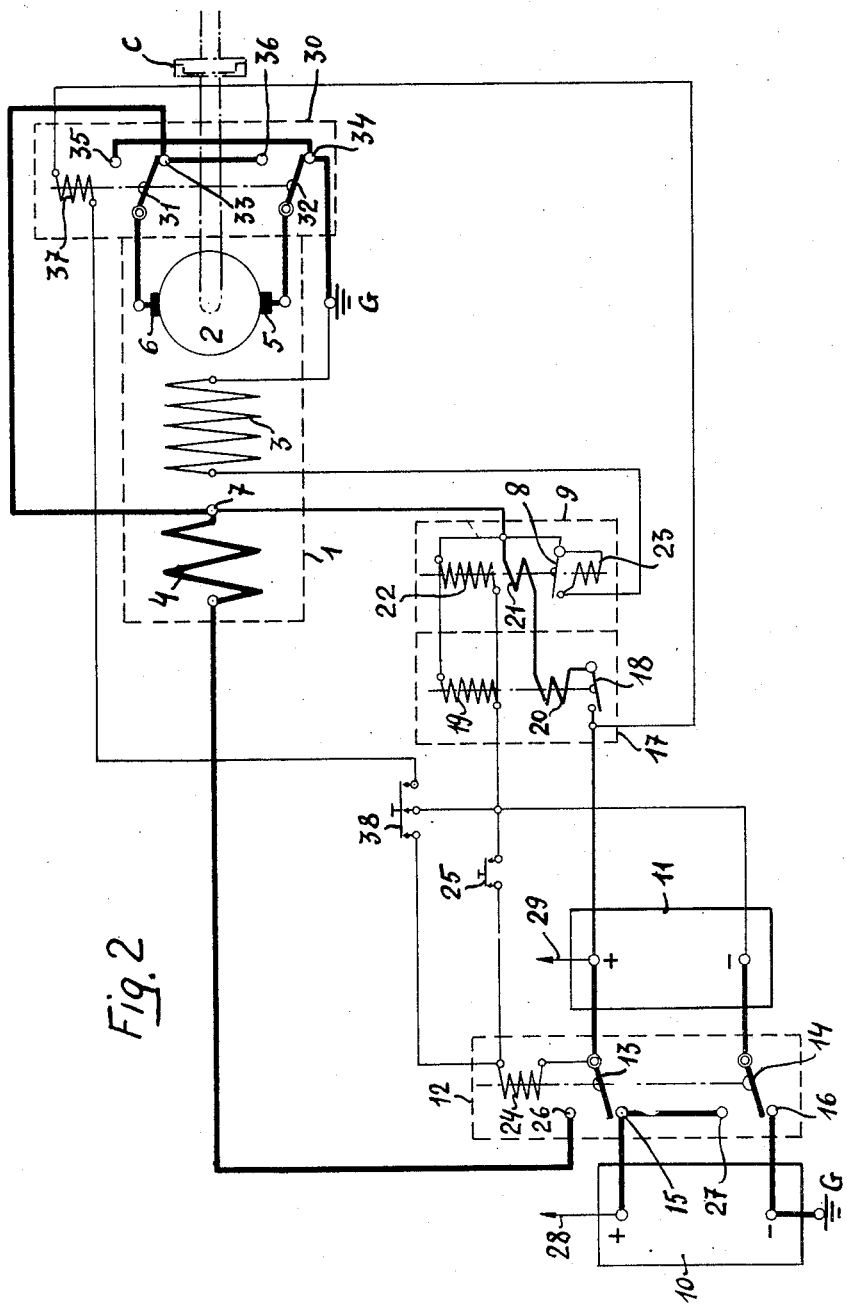
Figure 2 is the electric diagram of an electrical system which permits the starting of a two-cycle engine in either direction.

By means of the device according to the invention, it is possible to reverse starting of the generator. This is obtained, as shown in Figure 2, by providing a special switch 30, preferably of the distant controlled type, which is proivded with two movable switching contacts 31 and 32 which are connected with the terminals 5 and 6 of the rotor and which, when the switch is maintained in rest position by a spring (not shown), connect the rotor with the vehicle body (terminal G) and with the terminal 7 of the starting generator 1. This is due to the fact that the switching contact 32 is in leading contact with the fixed contact 34 of switch 30 and the switching contact 31 is connected with the fixed contact 33 of the same switch. The switch 30 may be switched by means of a control coil 37, when this latter is connected to the battery 11 by depressing the tripolar push button 38. In this case, the movable contacts 31 and 32 are switched over, so that, after the switching, the terminal 5 is connected to the fixed contact 36 of switch 30 and terminal 6 is connected to the fixed contact 35 of this switch, while switch 6 is connected with the vehicle body (terminal G) and the terminal 5 is connected with terminal 7. In this manner, the connection of the two terminals of the rotor is inverted, so that the current flows through the rotor in a direction that is opposite and, due to the fact that the direction of the current within the field coils 3 and 4 has remained unchanged, the rotor 2 of the starting generator must rotate in opposite direction. As by operating the tripolar push button 38 also the switch 12 is switched over through its controlling coil 24, the batteries 10 and 11, which are connected in series, feed the starting generator at a high voltage, while the connections of its rotor are inverted, so that this rotor, through coupling C, may start a two cycle motor connected to this coupling (not shown), in reverse direction.

Figure 3:
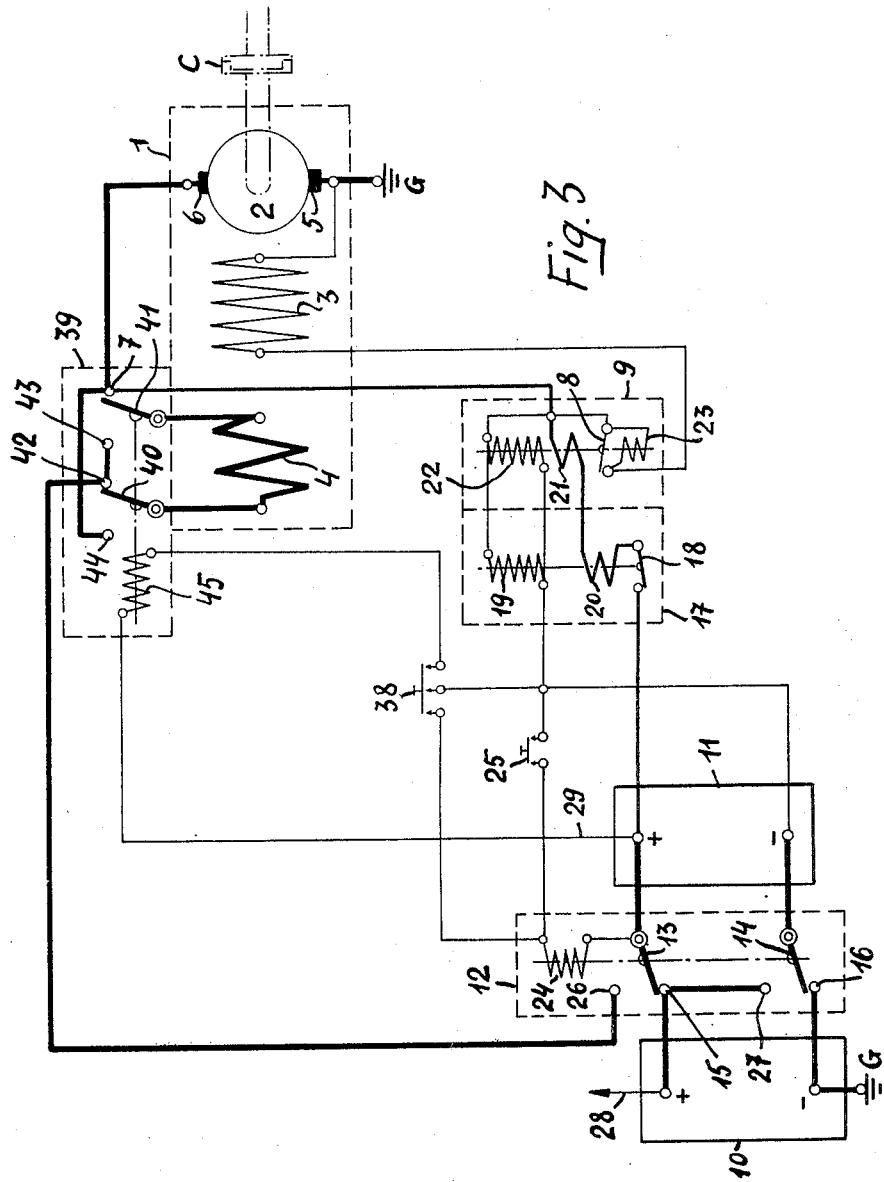
Figure 3 is another embodiment of the system shown in Figure 2.

A further variation of the invention may be effected by reversing the rotation of the rotor 2 of the starting generator by inverting the connections of the series coil 4. This switching is shown in Figure 3. In this diagram, the rotor 2 is inserted in a fixed manner within the circuit, while the two terminals of the main field winding, or series winding, 4 are connected with the distant-controlled switch 39, namely with its switching contacts 40 and 41. In the rest position of this switch 39, the switching contact is maintained by a spring (not shown) in contact with fixed contact 42, which in turn is connected with the fixed contact 26 of switch 12, while the movable contact 41 connects the other main field coil 4 with contact 7 from which the current may flow beyond the terminal 6 of the rotor 2. By depressing the tripolar push button 38, both the control coil 24 of switch 12 and control coil 45 of switch 39 are connected to the battery 11. These control coils promote a switching of the contacts of both switches, so that the series field coil 4 of the starting generator is connected to both batteries 10 and 11 connected in series between them. As the action of the series field coil 4 is considerably greater than that of the shunt coil, the result of energizing of the field coils is the reverse of that of the normal drive and, as the current flows through the rotor 2 in the same direction as before, this rotor must rotate in opposite direction.

For a perfect working of the starting device according to the invention it is essential that the shunt coil 22 of the voltage regulator and the shunt coil 19 of the switch 17 for the charging of the batteries be connected only by one of their ends with the terminal 7, namely to the contact of the rotor 2 which is connected to the body of the vehicle (contact G), and with the other end be connected with the negative pole of battery 11, which is not connected with the vehicle body, so that in case the battery is connected in series, through the coils may not flow a voltage that is higher than the normal working voltage, viz. the voltage when the starting generator functions as a shunt wound generator. In this manner, it is assured that during the starting, the contact 12 of switch 17 for the charge of the battery remains always open and switch contact 8 of the voltage regulator 9 remains always closed, so that the shunt field coil 3 remains always completely energized and the connection with the terminal 7 of the starting generator 1 and with the positive pole of the battery 11 remains interrupted.

I claim:

1. In an electrical starting and battery-charging system for internal combustion engines of vehicles of the class described, a starting generator provided with a rotor and compound windings comprising a shunt coil connected in parallel with the rotor and a main coil connected in series with the said rotor and said shunt coil, two accumulator batteries having an equal number of cells, inserted in the electric circuit of the rotor of the starting generator, which latter serves for charging the batteries when said starting generator is driven by the internal combustion engine, whereby said batteries in their turn serve for feeding both the field coils and the rotor of the starting generator when this latter functions as a motor, a regulating device depending upon the voltage in the circuit of the shunt coil, a switching device depending upon the current and the voltage in a line connecting the rotor of the starting generator and the battery and through which the current for charging the battery flows, but not the current for starting the starting generator, and a switch connected at the same time to the battery, the starting generator, the regulating device and to the current and voltage operated switching device, said first named switch being constructed and mounted in such a manner that in its rest position it switches off the main coil of the starting generator, inserts in parallel the two batteries and connects said two batteries, through the said switching device, with the rotor of the starting generator, and the same switch, in its working position, connects the two batteries in series between them and directly with the main coil of the starting generator.

2. An electrical starting and battery-charging system according to claim 1, in which the first of the two batteries is connected by one of its poles, by means of leads through which flows either the current for charging the batteries, or also the current for driving the starting generator, when this functions as a motor, with that terminal of the rotor of said starting generator which is not connected with the main coil, and the bipolar switch has two movable switching contacts and four fixed contacts, whereby both its movable contacts and three of its fixed contacts are connected with the poles of the two batteries in such a manner that in the rest position of the switch the batteries are connected in parallel between them and in working position of the switch said batteries are connected in series in a known manner, while the fourth fixed contact of the switch is connected with the free terminal of the main coil of the starting generator, the whole being arranged in such a manner that in the working position of the switch, the starting generator acts as a compound wound motor, which is fed by both batteries in series.

3. An electrical starting and battery charging system according to claim 2, in which voltage coils which control the operation of the regulating device and of the switching device, depending upon the current and voltage, are connected by one end with one of the terminals of the rotor of the starting generator and by their other end with a pole of one of the batteries, whereby when the switch is in rest position, said pole is connected with the other terminal of the said rotor, while in the working position of the switch, said pole is connected with the other battery.

4. An electrical system according to claim 3, in which the said voltage coils are inserted, in parallel between them, between the terminal of the rotor that is connected with the main coil of the starting generator and the movable contact of the switch which, when the said switch is in its working position, effects the connection between the opposite poles of the two batteries connected in series between them.

5. An electrical system according to claim 4, in which a further bipolar switch is provided, which is of a distant-controlled type and whose movable contacts are connected with the two terminals of the main coil and whose fixed contacts are connected in a known manner with the current feed lines connected to the said main coil, whereby the connection is effected in such a manner that, by the switching of the switch, the direction of flow of the current through the main coil is reversed.

6. In an electrical starting and accumulator-charging system of the class described, a starting generator provided with a rotor and compound shunt and main field windings, whereby the shunt field winding is shunted with respect to the generator rotor, the main field winding being connected in series with the rotor and shunt field winding, a battery comprising two battery halves each having an equal number of cells connected in an electric circuit with the starting generator when this latter functions as a generator for the charging of the battery, when the starting generator is driven by said combustion engine, and serving for feeding current to said starting generator, when this latter functions as a motor, a regulating device depending upon the voltage, inserted in the circuit of the shunt field winding, which is mounted in parallel to the rotor of the starting generator, a minimum-current relay depending upon the voltage, provided with a contact for insertion into the connecting line which conducts current to the battery, between said rotor and said battery; a distant-controlled bipolar switch connected with the battery, the starting generator, the regulating device and the minimum-current relay and having a rest position and a working position, which bipolar switch in its rest position connects in parallel the two battery halves between them and connects the battery halves through the minimum current relay with the rotor of the starting generator, and which switch in its working position, connects the two battery halves in series with one another and connects the said battery halves in series directly with the main field winding of the starting generator and also switches voltage coils, which control the operation of the regulating device and of the minimum current relay; a further distant-controlled bipolar switch being provided for the switching of direction of rotation of the rotor of the starting generator, said last named switch having movable contacts that are connected in a known manner to the terminals of the rotor, while the fixed contacts are connected to the leads which feed the current to the rotor, the whole being arranged in such a manner that, when the switch is switched, the direction of flow of the current through the rotor is reversed.

References Cited in the file of this patent

UNITED STATES PATENTS

| Number | Name | Date |
|---|---|---|
| 1,150,523 | Kettering | Aug. 17, 1915 |
| 1,231,266 | Kettering | June 26, 1917 |
| 1,255,517 | Edison | Feb. 5, 1918 |
| 1,369,220 | Chryst | Feb. 22, 1921 |
| 1,802,851 | Thrane | Apr. 28, 1931 |
| 2,344,568 | Snyder | Mar. 21, 1944 |
| 2,521,969 | Dugan | Sept. 12, 1950 |
| 2,692,953 | Markett | Oct. 26, 1954 |